United States Patent
Evans et al.

(10) Patent No.: US 11,987,525 B2
(45) Date of Patent: May 21, 2024

(54) MORTAR CONTAINING POLYURETHANE DISPERSION WITH ETHYLENE OXIDE UNITS

(71) Applicant: SIKA TECHNOLOGY AG, Baar (CH)

(72) Inventors: Craig Evans, Greater Manchester (GB); Ian Martin, Barrow (GB); Yolanda Pardos, Madrid (ES); Ramiro Garcia, Madrid (ES); Luz Granizo, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 1169 days.

(21) Appl. No.: 16/630,000

(22) PCT Filed: Aug. 21, 2018

(86) PCT No.: PCT/EP2018/072582
§ 371 (c)(1),
(2) Date: Jan. 10, 2020

(87) PCT Pub. No.: WO2019/038297
PCT Pub. Date: Feb. 28, 2019

(65) Prior Publication Data
US 2021/0087112 A1    Mar. 25, 2021

(30) Foreign Application Priority Data

Aug. 22, 2017   (EP) .................... 17187329

(51) Int. Cl.
| | | |
|---|---|---|
| *C04B 24/28* | (2006.01) | |
| *C04B 14/06* | (2006.01) | |
| *C04B 14/28* | (2006.01) | |
| *C04B 18/14* | (2006.01) | |
| *C04B 24/26* | (2006.01) | |
| *C04B 28/04* | (2006.01) | |
| *C04B 28/14* | (2006.01) | |
| *C04B 111/27* | (2006.01) | |
| *C04B 111/60* | (2006.01) | |
| *C04B 111/72* | (2006.01) | |

(52) U.S. Cl.
CPC ............ *C04B 24/282* (2013.01); *C04B 14/06* (2013.01); *C04B 14/28* (2013.01); *C04B 18/146* (2013.01); *C04B 24/2635* (2013.01); *C04B 28/04* (2013.01); *C04B 28/14* (2013.01); *C04B 2111/27* (2013.01); *C04B 2111/60* (2013.01); *C04B 2111/72* (2013.01)

(58) Field of Classification Search
None
See application file for complete search history.

(56) References Cited

U.S. PATENT DOCUMENTS

| | | | |
|---|---|---|---|
| 3,905,929 A | 9/1975 | Noll | |
| 5,807,431 A | 9/1998 | Tsai et al. | |
| 6,051,634 A * | 4/2000 | Laas | ................ C08G 18/0866 |
| | | | 106/713 |
| 2013/0098721 A1* | 4/2013 | Lai | .......................... A45C 5/14 |
| | | | 190/110 |

FOREIGN PATENT DOCUMENTS

| | | | | |
|---|---|---|---|---|
| CN | 101265318 A | 9/2008 | | |
| CN | 104829197 A | 8/2015 | | |
| EP | 1 184 364 A1 | 3/2002 | | |
| EP | 1184364 A1 * | 3/2002 | ............... | A61K 8/87 |
| FR | 2 792 932 A1 | 11/2000 | | |
| FR | 2792932 A1 * | 11/2000 | ........... | C04B 24/163 |
| JP | 2000-178059 A | 6/2000 | | |
| JP | 2000178059 A * | 6/2000 | ............. | C04B 14/00 |
| KR | 101654182 B1 | 9/2016 | | |
| RU | 2 552 980 C2 | 6/2015 | | |

OTHER PUBLICATIONS

JP-2000178059-A, Jun. 2000, Machine translation (Year: 2000).*
FR-2792932-A1, Nov. 2000, Machine translation (Year: 2000).*
Nov. 13, 2018 Search Report issued in International Patent Application No. PCT/EP2018/072582.
Nov. 13, 2018 Written Opinion of the International Searching Authority issued in International Patent Application No. PCT/EP2018/072582.

\* cited by examiner

*Primary Examiner* — Satya B Sastri
(74) *Attorney, Agent, or Firm* — Oliff PLC

(57) ABSTRACT

A composition including: at least one waterbased polyurethane dispersion containing ethylene oxide units; at least one cement; and at least one mineral filler. The composition can be mixed and applied without coagulation of the polyurethane dispersion. Upon curing, it has a high strength and good adhesion properties, with surprisingly low shrinkage and most surprisingly good water impermeability properties. It is particularly suitable for the use as repair mortar, waterproofing mortar or screed mortar.

14 Claims, No Drawings

MORTAR CONTAINING POLYURETHANE DISPERSION WITH ETHYLENE OXIDE UNITS

TECHNICAL FIELD

Polymer modified cementitious mortar with good waterproofing properties, particularly suitable as repair mortar, waterproofing mortar or screed mortar.

BACKGROUND OF THE INVENTION

Ordinary cement mortars are generally improved by the introduction of unreactine polymers in the cement matrix. Typical polymers therefor are acrylics, styrene acrylics, vinyl or vinylidene acetates, ethylene vinyl acetates and styrene butadiene copolymers. Such polymers are used in the form of waterbased dispersions or as redispersible powders, typically obtained by spray-drying of the corresponding dispersion. Such polymer modified mortars are typically easy to apply and non-hazardous. But although polymers improve the properties of ordinary cement mortars, the performance of such polymer modified mortars is still far away from that of cementitious products containing reactive polymers, such as epoxy resins as for example in Sikagard®-720 EpoCem® (from Sika), or isocyanate-containing polyurethanes as for example in Sikafloor®-20 PurCem® (from Sika). However, the handling and application of reactive polymer containing mortars is much more complicated. It requires the handling of hazardous materials, which needs specially trained and skilled workers and special equipment. Both are typically not available on ordinary building sites Polyurethane dispersions are known to enable materials with high mechanical performance. They are mainly used for high quality coatings in various application fields. They contain a dispersed, unreactive polyurethane polymer, which is typically stabilized by incorporated anionic or cationic groups. However, the use of such polyurethane dispersions in cementitious systems is not common and difficult. The strong electrolytes in cemetitious systems typically disturb the stability of the dispersed polyurethane particles, which results in coagulation of the dispersion. This causes immediate thickening upon mixing of the dispersion with a cementitious material and the formation of an inhomogeneous, solid mass. Often, there is an immediate, unpleasant, ammonia-like smell upon mixing, caused by the release of an amine-based counterion of a anionic polyurethane dispersion.

U.S. Pat. No. 3,905,929 teaches the manufacturing of polyurethane dispersions having side chain polyoxyethylene units. A combination with cementitious material is not taught.

U.S. Pat. No. 5,807,431 describes the use of carboxylic groups containing polyurethane dispersions in cementitious systems, wherein the carboxylic groups are crosslinked by the addition of polycarbodiimides before mixing of the polyurethane dispersion with a cementitious material. But carbodiimides are hazardous materials which are not easy to handle on a building site.

SUMMARY OF THE INVENTION

The purpose of this invention is to provide a polymer modified cementitious mortar with improved properties, which is easy to apply without handling of hazardous materials and which doesn't cause unpleasant odours, immediate thickening and/or lumps upon mixing.

Surprisingly this task is fulfilled by a composition according to claim 1. It comprises at least one waterbased polyurethane dispersion containing ethylene oxide units, at least one cement and at least one mineral filler. Unexpectedly, such a composition can be mixed easily with ordinary tools without coagulation of the polyurethane dispersion. It forms a fluid or paste-like slurry with usual workability time for mortar systems. The inventive composition enables polymer modified cementitious mortars with easy mixing and good application performance without forming lumps or causing unpleasant smells.

Surprisingly the hardened composition has a very low shrinkage, much lower than polymer modified mortars based on acrylics or ethylene vinyl acetates or the like. This is an important feature, as high shrinkage can lead to cracks in the cured material. A low shrinkage behaviour is particularly important for applications in high layer thickness or for wide area applications.

Further, the composition according to claim 1 shows a very hydrophobic surface and very good water impermeability properties, which is most surprising, as polyurethane dispersions containing ethylene oxide units are not known as being particularly hydrophobic. The water impermeability properties of the inventive composition are even close to the ones of cementitious mortars modified with reactive epoxy resins, which are known to form a highly hydrophobic material upon curing. Good water impermeability properties are important for waterproofing mortars, screed mortars or primers, which prevent water from beneath to cause damage to materials placed above.

Such low shrinkage behaviour and good water impermeability properties could not at all be expected from state of the art and is most surprising.

With the described good properties and easy handling, the inventive composition is particularly suitable as repair mortar, waterproofing mortar or screed mortar. It enables polymer modified mortars with easy handling, good application properties, low shrinkage, good water impermeability properties and a highly hydrophobic surface without the need of handling a reactive polymer upon use of the mortar.

Other aspects of the invention are described in other independent claims. Preferred aspects of the invention are described in dependent claims.

DETAILED DESCRIPTION OF THE INVENTION

The subject of the invention is a composition comprising
at least one waterbased polyurethane dispersion containing ethylene oxide units,
at least one cement, and
at least one mineral filler.

The term "ethylene oxide unit" refers to a unit of the formula —O—$CH_2$—$CH_2$— derived from a polymerisation process based on ethylene oxide.

The term "polyurethane dispersion containing ethylene oxide units" refers to a polyurethane material containing chains with repeated ethylene oxide units (O—$CH_2$—$CH_2$)$_n$ dispersed in water. That means the polyurethane material is not water soluble but forms a stable dispersion in water.

The term "polyurethane polymer" includes all polymers prepared by the so-called diisocyanate polyaddition process. Besides urethane groups they can also contain other groups, particularly urea groups.

The term "mineral filler" refers to a powdery or small sized granular inorganic material different from cement with a size of usually below 5 mm.

The term "molecular weight" refers to the molar mass (given in grams per mole) of a molecule. The term "average molecular weight" refers to the number-average molecular weight ($M_n$) of a mixture of oligomeric or polymeric molecules.

The term "shelf life stability" refers to the ability of a composition to be stored at room temperature in a suitable container under exclusion of moisture for a certain time interval, in particular several months, without undergoing significant changes in application or end-use properties.

Substance names starting with "poly", such as polyol, polyisocyanate or polyamine, refer to substances carrying two or more of the respective functional groups per molecule.

In this document the acronym "VOC" stands for "volatile organic compound", which is an organic substance having a vapour pressure of at least 0.01 kPa at a temperature of 293.14 K.

In this document, "room temperature" refers to a temperature of 23° C.

The waterbased polyurethane dispersion contains ethylene oxide units. Repeated ethylene oxide units are hydrophilic. They act as internal surfactant and enable or facilitate the polyurethane polymer to form a stable dispersion in water. Such a composition can surprisingly be mixed and applied without coagulation of the polyurethane dispersion.

The polyurethane in the waterbased polyurethane dispersion is preferably not a copolymer with polymers from free radical polymerisation such as acrylics, styrene acrylics or vinyl acetates.

The polyurethane in the waterbased polyurethane dispersion has only minimal impact on the rheological properties, workability and working time of the composition.

Preferably the polyurethane dispersion contains an amount of ethylene oxide units in the range of from 5 to 50 weight-%, more preferably 5 to 30 weight-%, particularly 8 to 20 weight-%, based on the total weight of the polyurethane polymer without water, diluents or other additives.

It is important that the polyurethane dispersion contains a well balanced amount of ethylene oxide units. Too high amount of ethylene oxide units brings undesired hydrophilic properties into the cured material, and too low amount of ethylene oxide units can cause instability of the dispersion. In the preferred range, the dispersed polyurethane material is stable, not too hydrophilic and does not act as a thickener in the mixed composition. This allows the application of the composition in the usual way for mortars.

Preferably, at least part of the ethylene oxide units are present in the polyurethane polymer as side chains. Preferably, these side chains are terminated with alkoxy groups, particularly methoxy groups. Such ethylene oxide side chains are particularly suitable as internal surfactant in polyurethane dispersions.

Preferably the polyurethane dispersion contains only a low amount of ionic groups incorporated in the polyurethane polymer.

Preferably the amount of ionic groups incorporated in the polyurethane polymer is below 20 mmol, more preferably below 10 mmol, particularly below 5 mmol, ionic groups per 100 g of the polyurethane polymer without water, diluents or other additives.

Most preferably the polyurethane dispersion is free of incorporated ionic groups. Such a polyurethane dispersion can be called a "nonionic polyurethane dispersion".

Preferably the polyurethane dispersion has a solids content in the range of 15 to 65 weight-%, more preferably 25 to 60 weight-%.

Preferably the polyurethane dispersion contains at least one diluent, which is an organic material and liquid at room temperature. Preferably the diluent is free from isocyanate reactive groups.

Such a diluent can also be called solvent, plasticizer or coalescing agent. The diluent can help for manufacturing of the dispersion by diluting the organic phase, it can help to raise the solids content of the dispersion, it can help to form a high quality material upon curing of the dispersion and it can help to get beneficial properties for the inventive composition.

Preferably the diluent is not a VOC.

Preferred diluents include pyrrolidones such as N-methyl-2-pyrrolidone, N-ethyl-2-pyrrolidone or N-dodecyl-2-pyrrolidione, organic ethers such as propylene glycol ethers or dipropylene glycol ethers, acetals such as 2,5,7,10-tetraoxaundecane, and organic esters such as adipate esters, phthalate esters or phosphate esters.

A particularly preferred diluent is 2,5,7,10-tetraoxaundecane.

A suitable polyurethane dispersion is obtainable by dispersing an isocyanate-functional polyurethane polymer containing ethylene oxide units in water, followed by chain extension via reaction of the isocyanate groups with a chain extender.

Optionally, the isocyanate-functional polyurethane polymer contains a diluent free of isocyanate reactive groups when it is mixed with water, as mentioned above.

The step of dispersing can be done in any suitable way, particularly by mixing water into the isocyanate-functional polyurethane polymer, or by mixing the isocyanate-functional polymer into water, or by mixing the isocyanate-functional polyurethane polymer and water in a mixing unit of a continuous mixing equipment. Preferably the isocyanate-functional polyurethane polymer has a temperature in the range of 15 to 90° C., more preferably 30 to 70° C., particularly 50 to 70° C., in the step of dispersing. Preferably the water has a temperature in the range of 1 to 35° C., more preferably 1 to 25° C., most preferably 5 to 20° C., in the step of dispersing. It can be beneficial to add part of the water in the form of crushed ice. The combination of a prewarmed polymer and cold water enables a good and fast mixing of the polymer with the water and minimizes the amount of side reactions.

If a diluent is used together with the isocyanate-functional polyurethane polymer, the diluent can also help to decrease the viscosity of the polymer and support easier mixing of the polymer with the water.

The step of chain extension is typically done towards the end or shortly after the dispersion step.

Water can act as chain extender, as water reacts with isocyanate groups under chain extension and release of $CO_2$ to form urea linkages. If water is used as sole or main chain extender, the dispersed polyurethane polymer is preferably brought to a temperature in the range of 20 to 90° C. Vacuum can be used, at least from time to time, to help the carbon dioxide leave the dispersion.

Preferably the chain extender is an amine, particularly a polyamine or an amino alcohol, with a molecular weight in the range of 32 to 400 g/mol.

Particularly preferred chain extenders include hydrazine, 1,2-ethane diamine, 1,2-propane diamine, 1,3-propane diamine, 1,4-butane diamine, 1,6-hexane diamine, 2-methyl-1,5-pentane diamine, 3-aminomethyl-3,5,5-trimethylcyclohexylamine (isophoronediamine), 2,2(4),4-trimethylhexanediamine, 1,3-bis(aminomethyl)benzene, 1,3-bis(aminomethyl)cyclohexane, 1,4-bis(aminomethyl)cyclohexane, 1,2-diaminocyclohexane, 1,3-diaminocyclohexane, 1,4-diaminocyclohexane, 1-methylcyclohexane-2,4(6)-diamine or combinations thereof.

Preferably the chain extender is used in such an amount that at least 80%, preferably at least 90%, of the isocyanate groups can react with the chain extender. After chain extension, any remaining free isocyanate groups can react with water under further chain extension.

It can be beneficial to use the chain extender in a diluted form with water.

If some ionic groups should be incorporated into the dispersion, a sulfonate group containing diamine can be used together with the chain extender, such as N-(2-aminoethyl)-2-aminoethane sulfonate acid or a salt thereof (AAS salt).

The steps of dispersion and chain extension of the polyurethane polymer can be done in the presence of at least one diluent. If a VOC solvent, such as methyl ethyl ketone for example, is used as diluent, it is preferably removed from the dispersion after chain extension, particularly by a distillation process.

A suitable isocyanate-functional polyurethane polymer containing ethylene oxide units, which is suitable for dispersing in water followed by chain extension to form the described polyurethane dispersion, is obtainable by reaction of at least one first polyol free from ethylene oxide units with an average molecular weight in the range of 400 to 8,000 g/mol, at least one second polyol containing ethylene oxide units with an average molecular weight in the range of 400 to 8,000 g/mol, and at least one polyisocyanate, whereby the isocyanate groups are in stoichiometric excess over the hydroxyl groups.

The polyisocyanate and the polyols are reacted via known methods, preferably at temperatures between 50 and 100° C., optionally by using a suitable catalyst. Preferably the polyisocyanate is used in an amount corresponding to an isocyanate to hydroxyl group ratio in the range of 1.5 to 3, more preferably 1.8 to 2.5. Preferably the polyurethane polymer has a free NCO group content in the range of 1 to 10 weight-%, preferably 2 to 8 weight-%. Optionally the polyols and the polyisocyanate may be reacted in the presence of at least one diluent, which is free from isocyanate-reactive groups.

Suitable first polyols include polyether polyols, particularly with 1,2-propylene oxide- or with 1,4-butylenoxide-units, polyester polyols such as products of the polycondensation reaction of diols or triols with lactones or dicarboxylic acids or their esters or anhydrides, further polycarbonate polyols, block copolymer polyols with at least two different blocks of polyether, polyester or polycarbonate units, polyacrylate or polymethacrylate polyols, polyhydroxy-functional fats and oils, particularly natural fats and oils, polyhydrocarbon polyols, such as polyhydroxy-functional polyolefins, or mixtures thereof.

Preferred first polyols are diols.

Preferred first polyols have an average molecular weight in the range of 500 to 5,000 g/mol, preferably 800 to 4,000 g/mol.

Preferred first polyols are polypropylene glycols, polyester diols, polycarbonate diols and mixtures thereof.

A particularly preferred first polyol is a polypropylene glycol diol with an average molecular weight in the range of 800 to 4,000 g/mol, preferably 1,000 to 3,000 g/mol.

A preferred second polyol with ethylene oxide units is an ethoxylated derivative of a triol, particularly an ethoxylated trimethylol propane, of which only one of the three hydroxyl groups carries a chain of ethylene oxide units terminated by an alkoxy group, particularly a methoxy group. Such a second polyol incorporates a chain of ethylene oxide units in the form of a side chain, which is beneficial for its stabilising properties. Such a second polyol has preferably an average molecular weight in the range of 500 to 1,500 g/mol. It carries preferably 8 to 30 ethylene oxide units on average per molecule.

Such second polyols are commercially available, particularly Tegomer® D 3403 from Evonik or Ymer® N120 from Perstorp.

Another preferred second polyol is an ethylene oxide chain containing diol, particularly a polyethylene glycol. Such a second polyol has preferably an average molecular weight in the range of 500 to 3,000 g/mol. Such a second polyol doesn't incorporate the chain of ethylene oxide units as side chain. To act as surfactant, such ethylene oxide chains can form loops on the surface of the dispersed particles.

Optionally, a third polyol containing an ionic group or a group capable of forming an ionic group can be used together with the second polyol. Preferably, this third polyol is a diol containing a carboxylic group, particularly dimethylolpropanonic acid or dimethylolbutanoic acid or a polyester or polyether diol derived thereof.

If a third polyol containing a carboxylic group is used for the preparation of the isocyanate-functional polyurethane polymer, the carboxylic groups are neutralized with a suitable base to turn into anionic groups before the step of dispersing. A suitable base is particularly triethylamine or a waterbased solution of sodium carbonate, potassium carbonate, sodium hydroxide or potassium hydroxide.

Suitable polyisocyanates are aliphatic diisocyanates such as 1,6-hexanediisocyanate (HDI), 2,2,4- and 2,4,4-trimethyl-1,6-hexanediisocyanate (TMDI), 1-methyl-2,4(6)-diisocyanatocyclohexane, 1-isocyanato-3,3,5-trimethyl-5-isocyanatomethyl-cyclohexane (IPDI), perhydro-4,4'-diphenylmethane diisocyanate ($H_{12}$MDI), m- and p-xylylene diisocyanate (m- and p-XDI), m- and p-tetramethyl-1,4-xylylene diisocyanate (m- and p-TMXDI), or aromatic diisocyanates such as 4,4'-diphenylmethane diisocyanate, 2,4'-diphenylmethane diisocyanate and/or 2,2'-diphenylmethane diisocyanate and any mixtures of these isomers (MDI), or 2,4- and/or 2,6-toluylene diisocyanate and any mixtures of these isomers (TDI).

Preferred polyisocyanates are TDI, IPDI, TMDI or $H_{12}$-MDI, particularly TDI or IPDI.

The composition further comprises cement.

Basically, all cements can be used. The cement used may be any available cement type or a mixture of two or more cement types, for example the cements classified in DIN EN 197-1 as Portland cement (CEM I), or as Portland composite cement (CEM II), or as blast furnace slag cement (CEM III), or as pozzolanic cement (CEM IV), or as composite cement (CEM V). These main types are subdivided into sub-classes which are familiar to persons skilled in the art. Cements which are produced according to an alternative standard, for example ASTM C150 for Portland cement types, or ASTM C595 for blended hydraulic cements, as well as other national standards such as the Indian standard, are equally suitable.

A preferred cement is a CEM I Portland cement according to DIN EN 197-1, for example Portland cement type I-42.5, I-42.5 R or I-52.5, or a Portland cement according to ASTM C150.

Another preferred cement is calcium aluminate cement or calcium sulfoaluminate cement, optionally in combination with calcium sulfate and/or Portland cement. They feature short setting time and high early strength.

Together with cement, the composition may preferably further comprise so called supplementary cementitious materials (SMC). These are materials which can react in finely divided form with calcium hydroxide and water to form compounds with cementitious properties. Preferred examples of SMC are fly ash, slag, metakaolin, pozzolans or silica fume.

Fly ash is a fine powder consisting mainly of silicate glass containing silica, alumina, iron and calcium. It is a by-product of the combustion of pulverized coal in electric power generation plants and is collected from the exhaust.

Slag, also called blast furnace slag, is used in the form of a fine powder. It is formed as non-metallic by-product when iron ore, coke and a flux (for example limestone or dolomite) are melted together in a blast furnace.

Metakaolin is the morph reaction product of the calcination, typically at 600-850° C., of the clay mineral kaolin.

Pozzolans are a broad class of siliceous or siliceous and aluminous materials of natural origin.

Silica fume, also called microsilica, is a byproduct of producing silicon metal or ferrosilicon alloys. It consists primarily of amorphous silicon dioxide ($SiO_2$). The individual particles are extremely small.

The composition further comprises at least one mineral filler.

Preferably the mineral filler is selected from the group consisting of quartz flour, quartz sand, limestone sand, river sand, calcium carbonate, chalk, baryte, dolomite, wollastonite, talc, titanium dioxide and combinations thereof. Preferably the composition contains a mixture of two or more mineral fillers. Particularly preferred mineral fillers are quartz flour, quartz sand, calcium carbonate or chalk.

The composition may preferably further comprise other mineral materials which can react with water, particularly calcium sulfate.

Preferably the composition contains
  1 to 10, preferably 1 to 5, weight-% polyurethane polymer,
  0 to 5, preferably 0 to 2, weight-% diluents,
  1 to 60, preferably 2 to 50, more preferably 5 to 50, weight-% cement,
  10 to 80, preferably 30 to 70, weight-% mineral fillers,
  3 to 40, preferably 5 to 20, weight-% water, and
  0 to 30, preferably 0.1 to 55, weight-% further additives,
  based on 100 weight-% of the total composition.

In a preferred aspect of the invention, the composition further contains at least one organic polymer different from polyurethane. Such a polymer is preferably present in the form of a waterbased polymer dispersion or in the form of a redispersible powder, which is preferably obtained by spray-drying of a corresponding polymer dispersion.

Preferred is an organic polymer comprising styrene, ethylene, butadiene, acrylic esters, vinylidene chloride, vinyl chloride or vinyl acetate. Such a polymer is obtainable in the form of a waterbased dispersion by free-radical polymerization of unsaturated water-insoluble monomers in aqueous medium in the presence of at least one surfactant.

A preferred organic polymer different from polyurethane is selected from the group consisting of homo- or copolymers of acrylic esters (polyacrylates), copolymers of styrene and butadiene (SBR), copolymers of styrene and acrylic esters, polyvinylacetate (VA), copolymers of vinyl acetate, particularly ethylene vinyl acetate copolymers (EVA), polyvinylchloride, polychloroprene, and copolymers and mixtures thereof, and copolymers thereof with polyurethane. Particularly preferred is EVA, particularly in the form of a redispersable powder. This enables cost effective mortars with good water impermeability and low water content.

Further particularly preferred are polyacrylates or styrene acrylates. These enable cost effective mortars with good properties.

Preferably, the composition contains 0.1 to 30, preferably 0.5 to 25, weight-% organic polymer different from polyurethane based on 100 weight-% of the total composition.

The inventive composition optionally contains further ingredients, particularly
  accelerators for cement hydration, particularly nitrites, nitrates, chlorides, sulphates, carbonates, fluorides, oxides or hydroxides of alkali or earth alkali metals, organic amines, particularly hydroxyalkyl amines, or mixtures or combinations thereof,
  retarders of cement hydration, particularly hydroxy carboxylic acids or their salts, preferably tartaric acid,
  cement plasticizers, particularly PCE superplasticizers,
  shrinkage reducers,
  dispersing agents,
  defoamers,
  air detraining agents,
  surfactants,
  thickeners, particularly cellulose ethers,
  fibres, particularly out of glass, cellulose or polypropylene,
  light weight aggregates,
  stabilizers,
  colouring agents, particularly pigments, or
  biocides.

Preferably the composition is a multi component composition comprising
  a first component comprising the at least one waterbased polyurethane dispersion containing ethylene oxide units, and
  a second component comprising cement and at least one mineral filler,
wherein the first component is a waterbased fluid and the second component is a solid fine powder or granular material.

The first and the second component are, each separately, storage stable when stored in a suitable container.

For the first component, a suitable container is a closed watertight container.

For the second component, a suitable container is also a closed watertight container or a closed paper bag which is stored in the absence of liquid water. Further additives can be part of the first or the second component.

A diluent is preferably part of the first component.

An additional polymer dispersion is preferably part of the first component.

A redispersible polymer powder is preferably part of the second component.

Preferably the second component of such a multi component composition contains at least 5 weight-% cement based on 100 weight-% of the second component.

More preferably, the second component contains at least 10 weight-% of the sum of cement, SMC and calcium sulfate based on 100 weight-% of the second component.

Preferably the second component contains a maximum of 80 weight-%, more preferably a maximum of 70 weight-%, particularly a maximum of 60 weight-% cement based on 100 weight-% of the second component.

Such materials are particularly suitable as mortar, particularly as repair or waterproofing or screed mortar.

When contacted with each other and mixed together, the components form a fluid or paste-like slurry, which can be applied in the usual way for a state of the art fresh mortar without any coagulation of the polyurethane dispersion.

Just after mixing, the mixed composition is a so called "fresh mortar". It is then in the form of a free flowing material or a paste-like slurry, depending on the type of ingredients. For the use as repair mortar, a paste like slurry is preferred. For the use as screed mortar, a free flowing material with self-levelling properties is preferred.

The dispersed polyurethane in the waterbased polyurethane dispersion has only little or no impact on the rheological properties of the fresh mortar, particularly it does not act as a thickener.

Upon mixing, the cement comes into contact with water, which means the cement starts to react with water. This is called "hydration" or "setting" of the cement and leads finally to a cured or hardened mortar. The start of the hydration of the cement is usually delayed for minutes to hours from the mixing step, depending on the type of cement, used accelerators or retarders, temperature and other ingredients in the composition.

If SMC or other reactive mineral materials are part of the formulation, these contribute also to the setting reaction and the final strength of the hardened mortar.

The time between the mixing step and the moment, when the composition starts to build up strength, is called "workability time". A suitable workability time is depending from the type of application. It can be adjusted by the use of special types of cement, accelerators, retarders or other ingredients. A typical workability time is in the range of 5 minutes to 4 hours, preferably 15 minutes to 2 hours for application by hand.

It is important that the end of the workability time is not limited by an instability of the dispersed polymer particles, but by the setting of the cement in the composition. This ensures a homogenous material of high strength with good water impermeability and low shrinkage.

The dispersed polyurethane in the waterbased polyurethane dispersion has only little or no impact on the workability time or setting time of the mortar.

A suitable method for mixing of the components of the composition is mixing by hand with a spatula for small portions, or mixing with a mechanical mixer, or mixing in a cement mixer with mixing drum. The mixing time is dependent on the consistency and amount of the material. Mixing should be done until a homogenous material is formed. This takes typically about 30 seconds to 5 minutes.

The mixed composition (or the fresh mortar, respectively), is applied on a substrate with a suitable method within the workability time. Any usual method to apply fresh mortars is suitable, such as pouring, pumping, brushing, knife-coating, troweling, spraying or rolling.

After the application of the composition, most of the water is disappearing out of the composition during the process of hardening (or curing, respectively) to a hardened mortar. Some of the water is used up by the hydration of the cement, some of the water is possibly soaked into the substrate, on which the composition was applied, particularly if the substrate was a porous, rather dry material such as concrete, mortar, brick, sand, soil, rock or the like, and remaining water is eventually evaporating out of the composition, depending on the environmental conditions. During the loss of water in the hardening composition, the polymer particles of the polyurethane polymer and other polymer particles, if present, get in closer contact with each other and coalesce eventually to a cured polymer material, which is not redispersable anymore when the hardened mortar is in contact with water.

The application and the process of hardening typically takes place under environmental conditions, which means preferably at temperatures in the range of 5 to 45° C. and relative humidity in the range of 5 to 95%.

Another object of the invention is a process to produce the inventive composition by providing a first component comprising at least one waterbased polyurethane dispersion containing ethylene oxide units, as described before, a second component comprising at least one cement and at least one mineral filler, as described before, and optionally further components, wherein these components are each separately storage stable in a suitable container.

This process to produce the inventive composition is preferably followed by the application of the composition, comprising the steps of mixing the first and the second and optionally further components of the composition by a suitable method, applying the mixed composition with a suitable method within its workability time, and hardening or curing of the composition by setting of the cement.

Another object of the invention is the hardened composition obtained by the process described above.

The hardened composition has a surprisingly low shrinkage behaviour. Preferably, the linear shrinkage, measured 56 days after application and storage at 23° C. and 50% relative humidity according to UNE-EN 12617-1, is lower than 0.7 mm/m, more preferably lower than 0.5 mm/m, most preferably lower than 0.4 mm/m. Such low shrinkage is beneficial regarding prevention of cracks, particularly for applications in high layer thickness or for wide area applications.

Further, the hardened composition has surprisingly good water impermeability properties, which means it has a low capillary absorption rate, low liquid- and low vapour-water transmission rate, and builds up a high electrical resistivity within a short time.

Further, the hardened composition has a highly hydrophobic surface, showing a surprisingly clear lotus effect with a drop of water on the surface.

Furthermore, the hardened composition has a high compressive and a high flexural strength, good adhesion properties, and a low water uptake when stored under water.

Another subject of the invention is the use of the inventive composition as repair mortar for structural repair.

For the use as repair mortar, the composition contains preferably 1 to 5, preferably 1 to 3, weight-% polyurethane polymer, 0 to 2 weight-% diluent, 0 to 5, preferably 0 to 3, weight-% other organic polymers, 15 to 40, weight-% cement, 30 to 70 weight-% of mineral fillers, 5 to 20, preferably 5 to 15, weight-% water, 0 to 1 weight-% fibres, 0.1 to 1 weight-% accelerators, and 0 to 5, preferably 0.1 to 3, weight-% further additives, based on 100 weight-% of the composition.

Preferably, the repair mortar has a short setting time and a fast buildup of strength. Its consistency can be fluid or paste-like up to self supporting, depending on the demand of the repair work.

Another subject of the invention is the use of the inventive composition as waterproofing mortar.

For the use as waterproofing mortar, the composition contains preferably 1 to 10, preferably 1 to 5, weight-% polyurethane polymer,
0 to 5, preferably 0.1 to 2, weight-% diluent,
1 to 30, preferably 5 to 25, weight-% other organic polymers, particularly at least some of it in the form of redispersible EVA powder,
1 to 20, preferably 2 to 10, weight-% cement,
30 to 70 weight-% of mineral fillers,
5 to 30, particularly 10 to 20, weight-% water, and
0 to 1, preferably 0.01 to 1, weight-% cement plasticizer,
0 to 1, preferably 0.01 to 1, weight-% accelerator,
0 to 5, preferably 0.1 to 2, weight-% further additives,
based on 100 weight-% of the composition.

Preferably, the waterproofing mortar has a fluid or paste-like up to self supporting consistency, depending on the type of application. It is important for a waterproofing mortar to develop a good water impermeability within short time, in order to prevent water from underneath to penetrate through and cause damage to structures or objects applied or placed on top of the waterproofing mortar.

Preferably, the waterproofing mortar has a capillary absorption of less than 0.1 kg/m$^2$·½ h, more preferably less than 0.05 kg/m$^2$·½ h, measured according to UNE-EN 13057.

Another subject of the invention is the use of the inventive composition as screed mortar.

For the use as screed mortar, the composition contains preferably 1 to 5, preferably 1 to 3, weight-% polyurethane polymer,
0 to 2 weight-% diluent,
0 to 5, preferably 0 to 3, weight-% other organic polymer,
10 to 40, preferably 10 to 30, weight-% cement,
30 to 80, preferably 40 to 70, weight-% of mineral fillers,
5 to 20, weight-% water, and
0 to 5 weight-% further additives,
based on 100 weight-% of the composition.

Preferably, the screed mortar has a fluid consistency with self-levelling properties and a long workability time combined with a fast development of strength. This enables wide flooring applications and a fast walk on time.

Preferably, the cement in the screed mortar is a combination of Portland cement and calcium aluminate or calcium sulfoaluminate cement, preferably in combination with calcium sulfate.

Within the scope of this invention, it is important that the polyurethane dispersion contained in the composition is stable during the mixing procedure and throughout the workability time. This means, coagulation of the dispersed polymer particles must not happen during mixing and application of the composition, as this would lead to immediate thickening and lumps, preventing a smooth application in the usual way for a fresh mortar.

Another subject of the invention is the use of a waterbased polyurethane dispersion containing ethylene oxide units as an additive in a cemetitious mortar system, as previously described. Surprisingly, this use enables polymer modified mortars with good application properties, surprisingly low shrinkage, surprisingly good water impermeability properties, high strength and good adhesion properties.

Preferably, the waterbased polyurethane dispersion containing ethylene oxide units is a nonionic polyurethane dispersion.

EXAMPLES

The following examples illustrate the present invention without being limitative. "Normal climate" means a temperature of 23±1° C. and a relative atmospheric moisture of 50±5%. "Nc" means "normal climate".

1. Nonionic Polyurethane Dispersions

PUD-N1:

50.88 weight parts water were placed in a round bottom flask at a temperature of 17° C. Then 28.4 weight parts of the isocyanate-functional polyurethane polymer P1 produced as described below, which had a temperature of 50° C., was added under good stirring, while a milky dispersion was formed. Immediately after, 12.72 weight parts of ice (frozen water) was added under maintained good stirring, followed by the addition of 8.00 weight parts of a solution of 20 weight-% Dytek®-A (2-methylpentamethylenediamine, from Invista) in water under good stirring. The dispersion was stirred for another 30 min.

The obtained waterbased polyurethane dispersion was a milky white fluid containing approximately 70 weight-% water, 24.9 weight-% chain-extended polyurethane polymer and 5.1 weight-% of the diluent 2,5,7,10-tetraoxaundecane. It is a nonionic polyurethane dispersion containing ethylene oxide units with a solids content of 30 weight-%.

The isocyanate-functional polyurethane polymer P1 was obtained by placing 18 weight parts 2,5,7,10-tetraoxaundecane, 16.5 weight-% Ymer® N120 (linear OH-difunctional polyethylene glycol monomethyl ether with an average molecular weight of 1000 g/mol based on ethoxylized trimethylolpropane, from Perstorp), and 46.05 weight-% Voranol® P 2000 (polypropylene glycol diol with an average molecular weight of 2000 g/mol, from Dow) in a round bottom flask under nitrogen atmosphere, followed by heating under stirring to 55° C. Then, 19.38 weight parts Vestanat® IPDI (isophoronediisocyanate, from Evonik) and 0.07 weight-% dibutyltindilaurate were added and the mixture was heated to 90° C. for 2 hours under constant stirring.

The obtained isocyanate-functional polyurethane polymer was a clear liquid. It was cooled to room temperature and stored in a moisture-tight container under nitrogen atmosphere. For the use in the polymer dispersion, it was preheated to 50° C.

PUD-N2:

Cromelastic® NI-77 (nonionic polyether-based aliphatic polyurethane dispersion with a solids content of 30 weight-%; from Cromogenia-Units).

2. Dispersions for Comparison

DISP-1:

Cromelastic® C-400 (cationic aliphatic polyurethane dispersion with a solids content of 25 weight-%; from Cromogenia-Units).

DISP-2:

Cromelastic® C-4480 (cationic polyether-based aliphatic polyurethane dispersion with a solids content of 23 weight-%; from Cromogenia-Units).

DISP-3:

Cromelastic® SE-80 (anionic polyether-based aliphatic polyurethane dispersion with a solids content of 40 weight-%; from Cromogenia-Units).

DISP-4:

Carboset® CA1008 (waterbased anionic polyurethane-acrylic dispersion with 48 weight-% solids, from Lubrizol).

3. Repair Mortars

Examples M-1 to M-6

A liquid component A was made separately for each example by blending the weight parts of the ingredients according to table 1. Each component A was stored in a sealed polyethylene bottle, where it was storage stable.

A solid granular component B was made by blending 32.8 weight parts of Portland cement CEM I 42.5 N/SR, 63.6 weight parts quartz sand of 0.1 to 2 mm diameter, 0.8 weight parts calcium oxide powder, 0.7 weight parts silica fume, 0.1 weight parts polypropylene fibres of 6 mm length and 2 weight parts of other mortar additives. The component B was stored in a sealed bucket, where it was storage stable. It was used for the examples M-1 to M-6.

The repair mortars of examples M-1 to M-6 were mixed by blending each component A with the component B in the mixing ratio given in table 1 and mixed with a Hobart-Mixer during 3 minutes to form a homogenous fresh mortar. Each fresh mortar was then tested as described below.

Application properties and workability time were measured by doing a flow test according to EN 1015-3 after 0 minutes, 5 minutes and 30 minutes from end of mixing.

Additional tests were made with the examples M-1, M-2, reference example M-6 and with the commercial polymer modified repair mortar Sika MonoTop®-412 SFG (from Sika) containing redispersible powder based on vinylacetate/vinylester/ethylene copolymer as reference example, and with the commercial 3-part cement and epoxy combination micro mortar for surface sealing Sikagard®-720 EpoCem® containing reactive epoxy resin (from Sika) as reference example.

Compressive and flexural strength were determined after 24 hours, 7 days and 28 days storage in normal climate according to EN 13892-2.

Bond strength was determined on dry concrete after 7 days normal climate by pull-off according to EN 1542.

Linear shrinkage was determined in normal climate and linear expansion was determined under water, both according to EN 12617-4 on prismatic specimens of 40×40×160 mm size.

Capillary absorption was determined according to EN 13057.

Electrical resistivity was determined according to UNE 83988-2.

Liquid-water transmission rate was determined according to ISO 1062-3.

Water-vapour transmission rate (permeability) was determined according to ISO 7783-2.

The lotus effect was tested by placing several drops of tap water out of a polyethylene pipette with an opening of 2 mm in diameter onto a cured, dry surface of the mortar. If the drops were lying on the mortar surface without wetting the surface at all, comparable to a drop of water on a lotus leave, the lotus effect was determined as "very high". "High" means, the drops of water stay in a compact ball without spreading on the mortar surface and wet the mortar surface to some extent, i.e. the mortar surface becomes a bit darker in the area of each drop. "No" means the drops spread to a flat circle and wet the mortar surface to a dark spot.

The results are given in tables 1 and 2.

"(ref.)" means reference example.

TABLE 1 composition, mixing and application behaviour of examples M-1 and M-2 and reference examples M-3 to M-6.

| example | M-1 | M-2 | M-3 (ref.) | M-4 (ref.) | M-5 (ref.) | M-6 (ref.) |
|---|---|---|---|---|---|---|
| component A | | | | | | |
| dispersion | PUD-N1 | PUD-N2 | DISP-1 | DISP-2 | DISP-3 | DISP-4 |
| | 60.0 | 60.0 | 72.0 | 78.3 | 45.0 | 37.5 |
| water | 39.5 | 39.5 | 27.5 | 21.2 | 54.5 | 62.0 |
| additives | 0.5 | 0.5 | 0.5 | 0.5 | 0.5 | 0.5 |
| mixing ratio A/B (weight) | 14/100 | 14/100 | 14/100 | 14/100 | 14/100 | 14/100 |
| mixing behaviour | good, no smell | good, no smell | good, no smell | good, no smell | strong smell of ammonia, turns to a lumpy solid | some smell of ammonia, fast thickening |
| flow value after | | | | | | |
| 0': | 163 mm | 169 mm | 128 mm | 129 mm | — | 145 mm |
| 5': | 159 mm | 176 mm | 128 mm | 129 mm | — | 145 mm |
| 30': | 150 mm | 181 mm | solid | solid | — | 122 mm |

TABLE 2 results of examples M-1 and M-2, reference example M-6 and commercial products for reference.

| example | | M-1 | M-2 | M-6 (ref.) | Sika MonoTop®-412 SFG (ref.) | Sikagard®-720 EpoCem® (ref.) |
|---|---|---|---|---|---|---|
| flexural strength [MPa] | 1 d: | 3.5 | 2.3 | n.d. | 5.3 | n.d. |
| | 7 d: | 6.0 | 4.9 | | 7.4 | |
| | 28 d: | 8.2 | 7.3 | | 9.2 | |
| compressive strength [MPa] | 1 d: | 13.8 | 8.2 | 8.1 | 29.3 | n.d. |
| | 7 d: | 37.6 | 23.3 | 21.8 | 53.4 | |
| | 28 d: | 48.2 | 31.0 | 31.9 | 60.2 | |
| bond strength [MPa] | | 1.8 | 1.5 | n.d. | 2.0 | n.d. |
| linear shrinkage [mm/m] | 7 d: | −0.094 | −0.017 | −0.002 | −0.337 | n.d. |
| | 28 d: | −0.270 | −0.254 | −0.352 | −0.505 | |
| | 56 d: | −0.360 | −0.367 | −0.530 | −0.723 | |
| linear expansion in water [mm/m] | 7 d: | +0.144 | +0.375 | n.d. | +0.146 | n.d. |
| | 28 d: | +0.216 | +0.452 | | +0.181 | |
| | 56 d: | +0.227 | +0.473 | | +0.196 | |
| capillary absorption [kg/m$^2$ · ½ h] | | 0.040 | 0.055 | n.d. | 0.200 | n.d. |
| electrical resistivity [kOhm/cm] | 7 d: | n.d. | <1 | <1 | <1 | 4 |
| | 14 d: | | <1 | <1 | <1 | 6 |
| | 21 d: | | 1 | <1 | <1 | 100 |
| | 28 d: | | 3 | 1 | 1 | n.d. |
| | 35 d: | | 3 | 2 | 2 | n.d. |
| | 42 d: | | 100 | 4 | 4 | n.d. |
| | 49 d: | | n.d. | 5 | 5 | n.d. |
| | 56 d: | | n.d. | 6 | 62 | n.d. |
| liquid-water transmission rate [kg/m$^2$ · ½ h] | | n.d. | 0.043 | n.d. | 0.390 | 0.030 |
| water-vapour transmission rate [g/m$^2$ · h] | | n.d. | 0.31 | 0.36 | 0.49 | 0.74 |
| lotus effect | | n.d. | high | n.d. | no | very high |

"n.d." means "not determined"

4. Waterproofing Mortars

Examples M-7 and M-8

A liquid component A was made separately for each example by blending 60.0 weight parts of PUD-N1 or PUD-N2 according to table 3, 39.5 weight parts water and 0.5 weight parts of mortar additives. Each component A was stored in a closed polyethylene bottle, where it was storage stable.

A solid granular component B was made by blending 6.0 weight parts Portland cement CEM I 52.5 R, 63.0 weight parts quartz sand of 0.1 to 0.3 mm diameter, 20.0 weight parts redispersible ethylene vinyl acetate powder, 4.2 weight parts calcium carbonate filler, 3.5 weight parts metakaolin, 2.5 weight parts silica fume and 0.8 weight parts additives. The component B was stored in a sealed bucket, where it was storage stable. It was used for the examples M-7 and M-8.

The waterproofing mortars of examples M-7 and M-8 were mixed by blending each component A with the component B in the mixing ratio given in table 3 and mixed with a Hobart-mixer during 3 minutes to form a homogenous fresh mortar. Each fresh mortar was then tested as described below.

Additional tests were made with the commercial waterproofing mortars Sikalastic®-1 K (from Sika) containing redispersible EVA powder and Sikalastic®-152 (from Sika) containing a polymer dispersion based on a copolymer of styrene and acrylic ester, as reference examples.

Flow test and capillary absorption were carried out as described for example M-1.

Bond strength was measured after 7 days on dry or wet concrete and after 7 days on dry concrete followed by 24 hours storage in water or in saturated calcium hydroxide according to EN 1542, as described in table 3.

Tensile strength and elongation were measured according to EN ISO 527 with dumb bells of 75 mm length, 25 mm neck length, 12.5 mm neck width and 4 mm thickness at a speed of 5 mm/min. The specimens were stored as described in table 3.

The results are given in table 3.

"(ref.)" means reference example.

TABLE 3 results of examples M-7 and M-8 and commercial products for reference.

| example | M-7 | M-8 | Sikalastic®-1 K (ref.) | Sikalastic®-152 (ref.) |
|---|---|---|---|---|
| dispersion in comp. A | PUD-N1 | PUD-N2 | | |
| mixing ratio A/B (weight) | 25/100 | 30/100 | | |
| mixing behaviour | good, no smell | good, no smell | good, no smell | good, no smell |

TABLE 3-continued results of examples M-7 and M-8 and commercial products for reference.

| example | | M-7 | M-8 | Sikalastic ®-1 K (ref.) | Sikalastic ®-152 (ref.) |
|---|---|---|---|---|---|
| flow value after | 0': | 163 mm | 157 mm | 178 mm | 217 mm |
| | 5': | 164 mm | 150 mm | 174 mm | 212 mm |
| | 30': | 159 mm | 147 mm | 169 mm | 212 mm |
| bond strength [MPa] | | | | | |
| on dry concrete: | | 0.59 | 0.37 | 0.59 | 0.29 |
| on wet concrete: | | 0.60 | 0.27 | 0.75 | 0.24 |
| 24 h in water: | | 0.53 | 0.27 | 0.58 | 0.21 |
| 24 h in saturated Ca(OH)$_2$: | | 0.48 | 0.40 | 0.61 | 0.28 |
| capillary absorption [kg/m$^2$ · ½ h] | | 0.025 | 0.030 | 0.037 | 0.067 |
| tensile strength [MPa] | | | | | |
| 28 d nc: | | n.d. | 2.22 | 0.77 | n.d. |
| 7 d nc + 21 d in water: | | n.d. | 0.59 | 0.57 | n.d. |
| 7 d nc + 21 d in water + 2 d nc: | | n.d. | 1.51 | 1.46 | n.d. |
| elongation [%] | | | | | |
| 28 d nc: | | n.d. | 20.6 | 12.2 | n.d. |
| 7 d nc + 21 d in water: | | n.d. | 11.0 | 3.6 | n.d. |
| 7 d nc + 21 d in water + 2 d nc: | | n.d. | 10.0 | 17.6 | n.d. |

"n.d." means "not determined"

5. Self-Levelling Screed Mortars

Example M-9

A liquid component A was made by blending 40.0 weight parts of PUD-N1, 59.2 weight parts water and 0.8 weight parts additives. The component A was stored in a closed polyethylene bottle, where it was storage stable.

A solid granular component B was made by blending 8.0 weight parts Portland cement CEM/52.2 R, 14.0 weight parts calcium sulfoaluminate cement, 39.8 weight parts quartz sand of 0 to 0.5 mm diameter, 30.9 weight parts calcium carbonate filler, 6.0 weight parts calcium sulfate powder and 1.3 weight parts additives. The component B was stored in a sealed bucket, where it was storage stable.

The self-levelling screed mortar was mixed by blending component A and component B in the mixing ratio A:B=25:100 (in weight) and mixed with a Hobart mixer during 3 minutes to form a homogenous fresh mortar. The fresh mortar was then tested as described below.

Additional tests were made with the commercial polymer modified self-levelling screed mortar Sika® Level-300 Extra (from Sika) containing redispersible EVA powder, as reference example.

Flow test, bond strength, flexural and compressive strength and capillary absorption were tested as described for example M-1.

The setting time was measured with the automated Vicat apparatus Vicatronic with a 1 mm needle according to DIN EN 196-3.

The results are given in table 4.

"(ref.)" means reference example.

TABLE 4 results of example MAO and commercial product for reference.

| example | | M-9 | Sika ® Level-300 Extra (ref.) |
|---|---|---|---|
| mixing behaviour | | good, no smell | good, no smell |
| flow value after | 0': | 332 mm | 223 mm |
| | 5': | 326 mm | 243 mm |
| | 30': | 327 mm | 247 mm |
| | 45': | 317 mm | 253 mm |
| bond strength [MPa] | | 1.50 | 1.55 |
| flexural strength [MPa] | 1 d: | 3.7 | 4.2 |
| | 7 d: | 3.9 | 4.1 |
| | 28 d: | 5.5 | 5.6 |
| compressive strength [MPa] | 1 d: | 16.0 | 15.5 |
| | 7 d: | 19.2 | 20.8 |
| | 28 d: | 27.4 | 28.5 |
| setting time (start/end) | | 50'/1 h 30' | 1 h 30'/1 h 50' |
| capillary absorption [kg/m$^2$ · ½ h] | | 0.210 | 0.252 |

"n.d." means "not determined"

The invention claimed is:

1. A composition comprising
   at least one waterbased polyurethane dispersion containing ethylene oxide units,
   at least one cement, and
   at least one mineral filler,
   wherein the polyurethane dispersion contains an amount of ethylene oxide units in a range of from 5 to 20 weight-% based on the total weight of the polyurethane polymer without water, diluents or other additives.

2. The composition according to claim 1, wherein the polyurethane dispersion is free of incorporated ionic groups.

3. The composition according to claim 1, wherein the mineral filler is selected from the group consisting of quartz flour, quartz sand, limestone sand, river sand, calcium carbonate, chalk, baryte, dolomite, wollastonite, talc, titanium dioxide and combinations thereof.

4. The composition according to claim 1, wherein it contains
1 to 10 weight-% polyurethane polymer,
0 to 5 weight-% diluents,
1 to 60 weight-% cement,
10 to 80 weight-% mineral fillers,
3 to 40 weight-% water, and
0 to 10 weight-% further additives,
based on 100 weight-% of the total composition.

5. The composition according to claim 1, wherein it further contains at least one organic polymer different from polyurethane.

6. The composition according to claim 1, wherein it is a multi component composition comprising
a first component comprising the at least one waterbased polyurethane dispersion containing ethylene oxide units, and
a second component comprising cement and at least one mineral filler,
wherein the first component is a waterbased fluid and the second component is a solid fine powder or granular material.

7. The composition according to claim 6, wherein the second component contains at least 5 weight-% cement based on 100 weight-% of the second component.

8. A process to produce the composition according to claim 6 by providing
a first component comprising at least one waterbased polyurethane dispersion containing ethylene oxide units,
a second component comprising at least one cement and at least one mineral filler,
and optionally further components,
wherein these components are each separately storage stable in a suitable container.

9. The process according to claim 8, further comprising the steps of
mixing the first and the second and optionally further components of the composition by a suitable method,
applying the mixed composition with a suitable method within its workability time, and
hardening or curing of the composition by setting of the cement.

10. A hardened composition obtained by the process according to claim 9.

11. The composition according to claim 1, wherein the composition is suitable as repair mortar for structural repair.

12. The composition according to claim 1, wherein the composition is suitable as waterproofing mortar.

13. The composition according to claim 1, wherein the composition is suitable as screed mortar.

14. A method comprising combining a waterbased polyurethane dispersion containing ethylene oxide units with a cementitious mortar system,
wherein the polyurethane dispersion contains an amount of ethylene oxide units in a range of from 5 to 20 weight-% based on the total weight of the polyurethane polymer without water, diluents or other additives.

* * * * *